3,243,420
POLYMERISATION OF OLEFINES

Anthony David Caunt, Welwyn Garden City, England, assignor to Imperial Chemical Industries Limited, Millbank, London, England, a corporation of Great Britain
No Drawing. Filed Jan. 14, 1963, Ser. No. 251,029
Claims priority, application Great Britain, Jan. 24, 1962, 2,662/62
12 Claims. (Cl. 260—93.7)

This invention relates to the polymerisation of olefines.

It is well known that alpha-olefines may be polymerised at low pressures using as catalyst a transition metal compound activated by an organo-metallic compound. Particularly useful as the transition metal compound are trivalent titanium materials, particularly when activated by organo-aluminum compounds.

The object of the present invention is to provide an improved process for the polymerisation of alpha-olefines.

According to the present invention I provide a process for polymerising alpha-olefines wherein a trivalent titanium material activated by organo-aluminum halide is used as catalyst in the presence of a hydrocarbon diluent in which is dispersed a preformed complex the product of reaction of an organo-aluminum compound having the formula $AlR^1R^2X^1$ where $R^1$ and $R^2$ are hydrocarbon radicals and $X^1$ is chlorine, or bromine, with a salt having the formula $MX^2$ where M is K, Rb, or Cs and $X^2$ is chlorine, or bromine, or with a quaternary ammonium halide. $R^1$ and $R^2$ may be the same or different. According to a preferred feature of my invention, the amount of preformed complex is less than 2 moles per mole of trivalent titanium present.

The complexes used in this invention are made by reacting an aluminum dialkyl or diaryl halide with any of the following salts: potassium chloride, potassium bromide, rubidium chloride, rubidium bromide, caesium chloride, caesium bromide, or any quaternary ammonium halide. The reaction is believed to take place according to the following scheme:

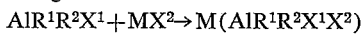

$$AlR^1R^2X^1 + MX^2 \rightarrow M(AlR^1R^2X^1X^2)$$

A suitable way of making the complex is to stir the components in roughly equi-molecular proportions in an aliphatic hydrocarbon diluent under an inert atmosphere. To promote reaction the mixture may be heated above the melting point of the complex. After reaction the mixture is cooled and the greater part of the complex which is formed precipitates as crystals, enabling the supernatant liquid to be decanted.

It is an important feature of my invention that the preformed complex is dispersed throughout the hydrocarbon diluent which is the medium in which polymerisation takes place. If the complex is soluble in the diluent at the temperature of polymerisation the most efficient degree of dispersion possible is automatically obtained. The complexes of this invention are generally soluble in aromatic hydrocarbons which are therefore useful diluents for the polymerisation. Where an aliphatic hydrocarbon in which the complex does not dissolve completely is to be used, dispersion may be obtained by polymerising at temperatures above the melting point of the complex. Alternatively the complex may be added to the diluent in dispersed form, e.g., dissolved in an aromatic hydrocarbon or mixed with an aliphatic hydrocarbon at a temperature above the melting point of the complex. The complex may be preformed in situ in the polymerisation vessel; however, to ensure a substantial degree of reaction between the salt and the aluminum dialkyl halide it is necessary to use a much greater concentration of aluminum dialkyl halide than is desirably present during the polymerisation. This difficulty may be overcome by preforming the complex in the presence of a small quantity of diluent, and adding more diluent before beginning polymerisation.

Polymerisation according to this invention may be carried out using as catalyst a wide variety of trivalent titanium materials. Particularly useful are titanium trichloride materials, for example, those obtained by the reduction of titanium tetrachloride with hydrogen, those prepared by the reduction of titanium tetrachloride with organo-aluminum compounds as described in British Patent No. 789,781, and those obtained by the reduction of titanium tetrachloride with aluminum metal as described in British Patent No. 877,050. As activator according to this invention there is used at least one organo-aluminum halide, preferably an aluminum dialkyl halide in which each alkyl group has up to 4 carbon atoms, e.g., aluminum diethyl chloride. The hydrocarbon diluent may be any inert aliphatic cyclo-aliphatic or aromatic compound, or the liquified alpha-olefine monomer which is to be polymerised or a mixture of any of these. Convenient reaction pressures are between 1 and 30 atmospheres but higher (and in some cases, lower) pressures may also be used if desired. Polymerization temperature is suitably between 10 and about 90° C. The temperature may be selected to give polymer of the desired molecular weight (the higher the temperature, the lower the average molecular weight); the proportion of soluble polymer formed also increases with the temperature. Another method of controlling molecular weight is to add certain substances to the reaction mixture, notably hydrogen. After polymerisation the polymer obtained may be isolated and worked up by known methods.

The organo-aluminum compound, catalyst, and complexes used in this invention are all decomposed by oxygen and water; it is, therefore, generally necessary to exclude air and moisture at least partially from the preparations of the catalyst and the complex and also from the polymerisation.

The advantages obtained by my invention are that catalyst activity is increased and that this increased activity is maintained, at least in part, throughout the polymerisation to high monomer conversions. Further, when the complex is added in suitably small amounts, which vary according to the nature of the complex but are in any case less than 2 moles per mole of trivalent titanium, this increase in activity is not accompanied by any appreciable increase in the proportion of soluble polymer formed. Under suitable conditions the addition of complex according to my invention can increase the activity of a catalyst by a factor of about 2; thereby enabling either the time of polymerisation to be halved, or alternatively a substantial saving in the amount of catalyst used and of materials required for isolating and working up of polymer.

My invention is generally useful in the polymerisation of alpha-olefines for example, straight-chain alpha-mono-olefines such as ethylene, propylene, butene-1, pentene-1, hexene-1, heptene-1, and octene-1; and equally in the polymerisation of branched chain alpha-olefines for example, 3-methyl-butene-1, 4-methyl-pentene-1 and 4-methyl-hexene-1. These monomers may also be copolymerised, with each other or with dienes, to give random or block copolymers.

The following examples illustrate my invention but in no way limit it.

Examples

"Sinarol" which is a petrol fraction, having a boiling range 170–200° C., was degassed in the reaction vessel at reaction temperature by alternately evacuating with a rotary pump and pressurising with argon, whilst stirring vigorously. The liquid was finally evacuated, and saturated to 1 atmosphere partial pressure with purified propylene, dried with 4.5 A. molecular sieve (ex British Drug Houses). Diethylaluminum chloride activator was admitted as 1.6 molar solution in "Sinarol" under gas tight conditions by means of a hypodermic syringe through a rubber seal followed by a solution of the complex in xylene. Catalyst was then admitted by similar means as a slurry in "Sinarol," and the polymerisation followed by observing the loss of propylene in a high pressure burette as gas was withdrawn through pressure-regulating devices into the reaction vessel. Rates of polymerisation were deduced from tangents drawn to a plot of grams propylene polymerised against time.

At the desired conversion 20 ml. normal butanol were injected destroying the catalyst and activator. The stirring was stopped and an aliquot (20 ml.) of the supernatant liquid was removed at reaction temperature and transferred to 250 ml. 4:1 by volume ethanol-acetone containing a weighed amount of dry insoluble polymer (3–5 grams). Polymer soluble in the original "Sinarol" was precipitated under these conditions onto the insoluble polymer which acted as an efficient carrier. The clear solution contained "Sinarol" and soluble complexes of catalysts residues which was removed by filtration and washing. The polymer was re-dried and weighed. The weight of soluble polymer in 20 ml. original "Sinarol" was deduced by difference, and from a knowledge of total polymer produced and total volume (1 litre) of "Sinarol" present a percentage yield of soluble polymer was deduced.

The following examples were carried out using a catalyst whose crystal structure by X-rays is a disordered form of violet $TiCl_3$ described by Professor Natta (J. Poly. Sci., 51, 399–410, 1961) prepared by reduction of $TiCl_4$ at 0° C. with 0.6 mole of ethylaluminum sesquichloride. The product was heat-treated at 85° C. for 4 hours and washed free from $EtAlCl_2$ soluble by-product.

The complex $K(Et_2AlCl_2)$ was prepared by stirring in an inert atmosphere dried KCl with one mole ratio of $Et_2AlCl$, the latter being added as 1.8 molar solution in "Sinarol." To ensure complete reaction the mixture was heated above the melting point of the complex (about 58° C.). On cooling to room temperature most of the complex crystallised out, allowing the supernatant liquid to be removed. Sufficient dry "Analar" xylene was added to dissolve the solid as a molar solution.

Examples I–III

TABLE 1.—THE EFFECT OF ADDING $K(Et_2AlCl_2)$

Total volume of "Sinarol", 1 litre.  
Polymerisation temperature, 50° C.  
Final conversion.  
20 mMoles/litre $Et_2AlCl$.  
10 mMoles/litre $Ti^{III}$.  
100 moles $C_3H_6$/mole $Ti^{III}$.

| Example | Complex, mMoles/litre | Polymerisation rate (moles $C_3H_6$/mole $Ti^{III}$ hour) | Percent soluble in "Sinarol" at 50° C. |
|---|---|---|---|
| Blank | 0 | 71½–57–49 | 3.2 |
| 1 | 5 | 121–106 | 3.7 |
| 2 | 10 | 140½ | 5.0 |
| 3 | 24.3 | 133 | 6.1 |

The experiments in the table above show how addition of complex not only corrects a fairly rapid fall-off in activity normally experienced but increases the initial activity substantially. In the blank experiment and in Example I polymerisation rates are changing. Figures quoted are averages over conversions (moles propylene/mole $Ti^{III}$) 5–32, 32–65½, 65½–100 in the blank experiment, and 7–54, 54–100 in Example I, respectively.

Example IV

TABLE 2.—HIGH CONVERSION POLYMERISATION USING LOW CATALYST CONCENTRATION

Catalyst system—  
10 mMoles/litre $Et_2AlCl$  
5 Mmoles/litre $Ti^{III}$

| Example | Complex, mMoles/litre | Polymerisation rate (moles $C_3H_6$/moles $Ti^{III}$ hour) | Conversion (moles $C_3H_6$/mole $Ti^{III}$) | Percent soluble in "Sinarol" at 50° C. |
|---|---|---|---|---|
| Blank | 0 | 67½–57–46–43–38 | 200 | 4.3 |
| 4 | 5 | 133–96–95–88 | 400 | 5.0 |

In these experiments polymerisation rates are changing. Figures quoted are averages for conversions (moles propylene/mole $Ti^{III}$) of 0–33, 33–71½, 71½–124, 124–155, 155–200 for the blank experiment and 9½–119, 119–214, 214–324, 324–400 for Example IV respectively.

Examples V and VI

Very good results can be obtained using no more alkyl than normal i.e. keeping the sum of moles free $Et_2AlCl$ and complexed $Et_2AlCl$ equal to moles of activator normally used. The advantage gained is sustained to high conversions as shown in Table 3.

TABLE 3.—RATES INCREASED WITHOUT USING EXTRA ALKYL

[Concentration of catalyst—10 mMoles/litre $Ti^{III}$]

| Example | mMoles/litre $Et_2AlCl$ added | | Time in hours to achieve the following percentage solids content | | Final conversion, moles $C_3H_6$ per mole $Ti^{III}$ | Percent Polymer soluble |
|---|---|---|---|---|---|---|
| | Free | Complexed as $K(Et_2AlCl_2)$ | 21% | 28% | | |
| Blank | 20 | 0 | 11½ | 19 | 830 | 4.0 |
| 5 | 15 | 5 | 6 | ¹ 10 | ² 550 | 4.2 |
| 6 | 10 | 10 | 5½ | ¹ 8¾ | ² 600 | 7.2 |

¹ Obtained by short extrapolation.  
² Runs were stopped at these conversions purely for administrative convenience; activity was still high.

Example VII

This Example illustrates preforming the complex in the polymerisation vessel; the table also shows the poor results obtained when the complex is not preformed.

TABLE 5.—KCl ADDED IN VARIOUS WAYS TO ACTIVATOR

Polymerisation temperature _____ 50° C.  
Total $Et_2AlCl$ added _____ 20 mM./litre.  
KCl _____ 5 mM./litre.  
Catalyst _____ 10 mM./litre.  
Conversion _____ 100 moles $C_3H_6$/mole $Ti^{III}$

| Example | Treatment before addition of catalyst | Polymerisation rate (moles $C_3H_6$/mole $Ti^{III}$ hour) | Percent polymer soluble at 50° C. |
|---|---|---|---|
| Blank (a) | No KCl added | 71½ | 3.2 |
| Blank (b) | KCl added to alkyl at normal dilution (20 mMoles per litre) at 50° C. | 76 | 4.9 |
| Blank (c) | KCl added as in (b) above but raised to 70° C. for ½ hour then cooled to 50° C. | 86 | |
| 7 | KCl premixed with 1.6 M Molar alkyl at 70° C. for ½ hour. "Sinarol" added and cooled to 50° C. | 117 | 5.4 |

Example VIII

A considerable reduction in polymerisation time is obtainable without much increase in percent yield of soluble polymer with other types of trivalent titanium catalyst activated with dialkylaluminum halides. For example a catalyst was prepared by reduction of boiling TiCl$_4$ with aluminum powder in the presence of AlCl$_3$. The excess TiCl$_4$ was distilled off and uncombined AlCl$_3$ removed by heating in vacuo at 180° C; the formula of the solid was then TiCl$_3$ 0.32 AlCl$_3$. This material was dry milled in a stainless steel mill. Table 6 shows the advantage of adding K(Et$_2$AlCl$_2$) to this system.

TABLE 6.—THE EFFECT OF K(Et$_2$AlCl$_2$) ON ALUMINUM-REDUCED TiCl$_4$ CATALYST

```
                                                    mM./litre
Free Et₂AlCl_____  20
TiCl₃ 0.32 AlCl₃_____  10
```

| Example | Complex, mMoles/litre | Time (hours) to achieve the following percentage solids content | | Percent soluble in "Sinarol" |
|---|---|---|---|---|
| | | 21% | 28% | |
| Blank | 0 | 14½ | 29 | 2.1 |
| 8 | 5 | 8 | 12½ | 3.7 |

Similar increases in activity with other complexes are obtainable. For instance KBr or (CH$_3$)$_4$NI can be used in place of KCl in the above examples.

I claim:

1. A process for the polymerization of propylene which comprises treating propylene at a temperature of between 10° and about 90° C., under a pressure of between 1 and 30 atmospheres with a catalyst consisting of titanium trichloride activated by diethyl aluminum chloride in the pressure of a hydrocarbon diluent in which is dispersed a preformed complex of formula $$K[Al(C_2H_5)_2Cl_2]$$

2. A process for the polymerization of an alpha-olefine having from 2 to 8 carbon atoms which comprises treating the alpha-olefine at a temperature of between 10° and about 90° C., under a pressure of between 1 and 30 atmospheres with a catalyst consisting of titanium trichloride activated by diethyl aluminum chloride in the presence of a hydrocarbon diluent in which is dispersed a preformed complex of formula $K[Al(C_2H_5)_2Cl_2]$.

3. A process for the polymerization of an alpha-olefine having from 2 to 8 carbon atoms which comprises treating the alpha-olefine at a temperature of between 10° and about 90° C., under a pressure of between 1 and 30 atmospheres with a catalyst consisting of titanium trichloride activated by a dialkylaluminum halide in the presence of a hydrocarbon diluent in which is dispersed a preformed complex, said complex being the product of reaction of, as the sole essential reactants, a dialkyl aluminum halide selected from the group consisting of the chlorides and bromides and a salt selected from the group consisting of tetra-alkylammonium halides and salts having the formula MX$^2$ wherein M represents a metal selected from the group consisting of potassium, rubidium and caesium and X$^2$ is selected from the group consisting of chlorine and bromine.

4. A process according to claim 3 wherein said salt is a tetra-alkyl ammonium halide.

5. A process according to claim 3 wherein the titanium trichloride is obtained by the reduction of titanium tetrachloride with aluminum metal.

6. A process according to claim 3 wherein the hydrocarbon diluent is aromatic.

7. A process according to claim 3 wherein said preformed complex is dispersed in said hydrocarbon diluent by addition thereto as a solution in an aromatic hydrocarbon.

8. A process according to claim 3 wherein the said preformed complex is preformed by reaction of the components thereof in roughly equimolar proportions under an inert atmosphere.

9. A process for the polymerization of an alpha-olefine having from 2 to 8 carbon atoms which comprises treating the alpha-olefine at a temperature of between 10° and about 90° C., under a pressure of between 1 and 30 atmospheres with a catalyst consisting of titanium trichloride activated by a dialkyl aluminum halide in the presence of a hydrocarbon diluent in which is dispersed up to 2 moles, per mole of titanium trichloride present, of a preformed complex, said complex being the product of reaction, as the sole essential reactant components, a dialkyl aluminum halide selected from the group consisting of the chlorides and the bromides and a salt selected from the group consisting of tetraalkyl ammonium halides and salts having the formula MX$^2$ wherein M represents a metal selected from the group consisting of potassium, rubidium and caesium and X$^2$ is selected from the group consisting of chlorine and bromine.

10. A polymerization medium consisting of titanium trichloride, diethylaluminum chloride and a hydrocarbon diluent having dispersed therein a preformed complex of formula $K[Al(C_2H_5)_2Cl_2]$.

11. A polymerization medium consisting of titanium trichloride, an aluminum diakyl halide wherein each alkyl group has up to four carbon atoms and a hydrocarbon diluent having dispersed therein $K[Al(C_2H_5)_2Cl_2]$.

12. A polymerization medium consisting of titanium trichloride, a dialkylaluminum halide and a hydrocarbon diluent having dispersed therein a preformed compex, said compex being the product of reaction of, as the sole essential reactant components, a dialkyl aluminum halide selected from the group consisting of the chlorides and bromides with a salt selected from the group consisting of tetra-alkyl ammonium halides and salts of the formula MX$^2$ where M is selected from the group consisting of potassium, rubidium and caesium and X$^2$ is selected from the group consisting of chlorine and bromine.

References Cited by the Examiner

UNITED STATES PATENTS 2,909,510  10/1959  Thomas _____ 260—94.9
2,909,511  10/1959  Thomas _____ 260—94.9

JOSEPH L. SCHOFER, *Primary Examiner.*

E. M. OLSTEIN, L. EDELMAN, *Assistant Examiners.*